US010389438B2

(12) United States Patent
Heo et al.

(10) Patent No.: US 10,389,438 B2
(45) Date of Patent: Aug. 20, 2019

(54) SATELLITE SIGNAL RELAY SYSTEM (71) Applicant: SOLiD, INC., Seongnam-si, Gyeonggi-do (KR)

(72) Inventors: Jaeyoung Heo, Seongnam-si (KR); Kyungmin Kim, Yongin-si (KR); Gilkook Kim, Seoul (KR); Bumsoo Park, Seongnam-si (KR); Chinhyoung An, Suwon-si (KR)

(73) Assignee: SOLiD, INC., Seongnam-si (KR)

( * ) Notice: Subject to any disclaimer, the term of this patent is extended or adjusted under 35 U.S.C. 154(b) by 67 days.

(21) Appl. No.: 15/570,596

(22) PCT Filed: Mar. 28, 2016

(86) PCT No.: PCT/KR2016/003148
§ 371 (c)(1),
(2) Date: Jan. 22, 2018

(87) PCT Pub. No.: WO2016/175460
PCT Pub. Date: Nov. 3, 2016

(65) Prior Publication Data
US 2018/0302156 A1 Oct. 18, 2018

(30) Foreign Application Priority Data
Apr. 30, 2015 (KR) .................... 10-2015-0061962

(51) Int. Cl.
*H04B 10/079* (2013.01)
*H04B 10/118* (2013.01)
(Continued)

(52) U.S. Cl.
CPC ....... *H04B 10/07953* (2013.01); *H04B 7/185* (2013.01); *H04B 7/18571* (2013.01);
(Continued)

(58) Field of Classification Search
CPC ............ H04B 10/07953; H04B 10/118; H04B 10/2575
See application file for complete search history.

(56) References Cited

U.S. PATENT DOCUMENTS

2012/0039320 A1* 2/2012 Lemson ................ H03F 1/3247
370/338
2012/0166960 A1* 6/2012 Salles .................... G06Q 30/00
715/738

(Continued)

OTHER PUBLICATIONS

International Search Report for PCT/KR2016/003148 dated Jul. 25, 2016.

*Primary Examiner* — Nathan M Cors
(74) *Attorney, Agent, or Firm* — Sughrue Mion, PLLC (57) ABSTRACT A satellite signal relay system according to an embodiment of the inventive concept includes: a plurality of remote units configured to receive an analog satellite signal, to convert the analog satellite signal into a digital satellite signal, to generate a characteristic signal for the analog satellite signal, to generate a transmission frame based on the digital satellite signal and the characteristic signal, and to convert the transmission frame into an optical transmission frame; and a central unit configured to convert optical transmission frames received from the plurality of remote units into transmission frames through an optical transmission medium, respectively, to extract a digital satellite signal and a characteristic signal from each of the converted transmission frames, and to convert any one of the extracted digital satellite signals into an analog satellite signal based on the extracted characteristics signals.

18 Claims, 4 Drawing Sheets (51) Int. Cl.
*H04B 10/2575* (2013.01)
*H04B 7/185* (2006.01)
*H04W 56/00* (2009.01)

(52) U.S. Cl.
CPC ....... *H04B 10/118* (2013.01); *H04B 10/2575* (2013.01); *H04W 56/001* (2013.01)

(56) References Cited

U.S. PATENT DOCUMENTS

| | | |
|---|---|---|
| 2012/0314797 A1 | 12/2012 | Kummetz et al. |
| 2013/0208655 A1 | 8/2013 | Jiang et al. |
| 2013/0294549 A1 | 11/2013 | Sun et al. |
| 2013/0321206 A1* | 12/2013 | Chang ..................... H01Q 3/34 342/372 |
| 2016/0283436 A1* | 9/2016 | Elsloo ................... G06F 15/167 |

\* cited by examiner

SATELLITE SIGNAL RELAY SYSTEM

CROSS-REFERENCE TO RELATED APPLICATIONS

This application is a National Stage of International Application No. PCT/KR2016/003148, filed Mar. 28, 2016, and claims priority from Korean Patent Application No. 10-2015-0061962, filed Apr. 30, 2015, the contents of which are incorporated herein by reference in their entireties.

BACKGROUND

1. Field

The inventive concept relates to a satellite signal relay system.

2. Description of the Related Art

In recent years, in response to a decrease in cell size and an increase in the number of cells in a service coverage due to a rapid increase in mobile traffic, a plurality of mobile communication service providers adopt a distributed type mobile communication base station structure in which a baseband unit (or a digital unit), which is a data processing unit of a base station, is arranged in a central office and a plurality of remote radio units, which are signal transmission and reception units of the base station, are separately arranged in a remote site. In addition, the plurality of mobile communication service providers centrally install a plurality of baseband units in the central office to optimize base station performance and efficiency, and to facilitate management and operation.

Each of the plurality of baseband units uses a satellite signal, for example, a global positioning system (GPS) signal, as a reference signal for synchronization. In this case, it is required to additionally provide a dedicated antenna for receiving satellite signals for each of the plurality of baseband units, so that costs for constructing the base station may increase, and efficiency of space utilization may be lowered. Furthermore, if the plurality of baseband units cannot receive satellite signals due to installation environment of the plurality of baseband units, jamming, or the like, synchronization becomes impossible and a service failure occurs.

SUMMARY

The inventive concept is directed to a satellite signal relay system capable of reducing construction cost of a mobile communication base station, improving spatial and installation efficiency, and preventing occurrence of a service failure, thereby improving service reliability of a base station.

According to an aspect of the inventive concept, a satellite signal relay system includes a plurality of remote units configured to receive an analog satellite signal, to convert the analog satellite signal into a digital satellite signal, to generate a characteristic signal for the analog satellite signal, to generate a transmission frame based on the digital satellite signal and the characteristic signal, and to convert the transmission frame into an optical transmission frame; and a central unit configured to convert optical transmission frames received from the plurality of remote units into transmission frames through an optical transmission medium, respectively, to extract a digital satellite signal and a characteristic signal from each of the converted transmission frames, and to convert any one of the extracted digital satellite signals into an analog satellite signal based on the extracted characteristics signals.

In an example embodiment, each of the plurality of remote units may detect characteristic information of the analog satellite signal, and may generate the characteristic signal based on the detected characteristic information.

In an example embodiment, the characteristic information may indicate a carrier-to-noise ratio (CN) of the analog satellite signal.

In an example embodiment, each of the plurality of remote units may receive a delay measurement signal received from the central unit through the optical transmission medium, and may generate the transmission frame based on the delay measurement signal, the digital satellite signal, and the characteristic signal such that the delay measurement signal is retransmitted to the central unit.

In an example embodiment, each of the plurality of remote units may include a remote-side RF processor configured to perform low-noise amplification on the analog satellite signal, to frequency down-convert the low-noise amplified analog satellite signal, and to filter and output the frequency down-converted analog satellite signal; an analog-to-digital converter configured to convert the filtered analog satellite signal into the digital satellite signal; a remote-side detector configured to detect characteristic information on the analog satellite signal distributed from the remote-side RF processor; a remote-side controller configured to generate the characteristic signal based on the detected characteristic information; a remote-side digital processor configured to generate the transmission frame based on the digital satellite signal received from the analog-to-digital converter and the characteristic signal received from the remote-side controller; and a remote-side optical transceiver configured to convert the transmission frame into the optical transmission frame and to transmit the optical transmission frame to the central unit through the optical transmission medium.

In an example embodiment, the remote-side digital processor may include a remote-side framer configured to generate the transmission frame based on the digital satellite signal and the characteristic signal.

In an example embodiment, the remote-side digital processor may include a remote-side deframer configured to extract a delay measurement signal from an optical transmission frame that is received from the central unit through the optical transmission medium, wherein the remote-side framer may generate the transmission frame based on the delay measurement signal, the digital satellite signal, and the characteristic signal received from the remote-side deframer.

In an example embodiment, the converted transmission frames may further include a delay measurement signal that each of the plurality of remote units retransmits to the central unit, wherein the central unit may measure a delay value for each of the plurality of remote units based on a delay measurement signal included in each of the converted transmission frames, may compensate for a delay of the extracted digital satellite signals based on at least one of the measured delay values and a predetermined delay value, and may convert any one of the delay-compensated digital satellite signals into the analog satellite signal based on the extracted characteristic signals.

In an example embodiment, the central unit may include a center-side optical transceiver configured to convert the optical transmission frames received from the plurality of remote units into the transmission frames through the optical transmission medium, respectively; a center-side digital processor configured to extract the digital satellite signal and the characteristic signal from each of the transmission frames received from the center-side optical transceiver, and to selectively output any one of the extracted digital satellite signals; a digital-to-analog converter configured to convert the digital satellite signal output from the center-side digital processor into the analog satellite signal; and a center-side RF processor configured to frequency up-convert the analog satellite signal.

In an example embodiment, the center-side digital processor may include a plurality of center-side deframers configured to extract a digital satellite signal and a characteristic signal from a corresponding one of the transmission frames received from the center-side optical transceiver; and a selector configured to selectively output any one of the extracted digital satellite signals.

In an example embodiment, the central unit may further include a center-side controller configured to control the selector such that any one of the extracted digital satellite signals is selectively output based on the characteristic signals received from the plurality of center-side deframers.

In an example embodiment, the converted transmission frames may further include a delay measurement signal that each of the plurality of remote units retransmits to the central unit, wherein the center-side digital processor may extract the digital satellite signal, the characteristics signal, and the delay measurement signal from each of the transmission frames received from the center-side optical transceiver, may compensate for a delay of the extracted digital satellite signals, and may selectively output any one of the delay-compensated digital satellite signals.

In an example embodiment, the center-side digital processor may include a plurality of center-side deframers configured to extract a digital satellite signal, a characteristic signal, and a delay measurement signal from a corresponding one of the transmission frames received from the center-side optical transceiver; a plurality of delay compensators configured to compensate for a delay of a digital satellite signal received from a corresponding one of the plurality of center-side deframers; and a selector configured to selectively output any one of the delay-compensated digital satellite signals received from the plurality of delay compensators.

In an example embodiment, the central unit may further include a center-side controller configured to measure a delay value for each of the plurality of remote units based on a delay measurement signal transmitted to the plurality of center-side deframers, to control the plurality of delay compensators such that the delay of the digital satellite signals is compensated based on at least one of the measured delay values and a predetermined delay value, and to control the selector such that any one of the delay-compensated digital satellite signals is selectively output based on the characteristic signals received from the plurality of deframers.

According to another aspect of the inventive concept, a satellite signal relay system includes a remote unit configured to receive an analog satellite signal, to convert the analog satellite signal into a digital satellite signal, to generate a transmission frame based on the digital satellite signal, and to convert the transmission frame into an optical transmission frame; and a central unit configured to convert an optical transmission frame received from the remote unit through an optical transmission medium into a transmission frame, to extract a digital satellite signal from the converted transmission frame, and to convert the digital satellite signal into an analog satellite signal.

In an example embodiment, the analog satellite signal may be a signal received from a global positioning system (GPS) satellite.

In an example embodiment, the remote unit may receive a delay measurement signal received from the central unit through the optical transmission medium, and may generate the transmission frame based on the delay measurement signal and the digital satellite signal such that the delay measurement signal is retransmitted to the central unit, wherein the central unit may extract the digital satellite signal and the delay measurement signal from the converted transmission frame, may measure a delay value for the remote unit based on the extracted delay measurement signal, may compensate for a delay of the extracted digital satellite signal based on at least one of the measured delay value and a predetermined delay value, and may convert the delay-compensated digital satellite signal into the analog satellite signal.

In an example embodiment, the central unit may transmit the analog satellite signal to at least one baseband unit constituting a base station through a predetermined transmission medium.

A satellite signal relay system according to embodiments of the inventive concept may reduce construction cost of a mobile communication base station, improve spatial and installation efficiency, and prevent occurrence of a service failure, thereby improving service reliability.

BRIEF DESCRIPTION OF THE FIGURES

A brief description of each drawing is provided to more fully understand drawings recited in the detailed description of the invention.

DETAILED DESCRIPTION OF EXEMPLARY EMBODIMENTS

Since the inventive concept may have diverse modified embodiments, preferred embodiments are illustrated in the drawings and are described in the detailed description. However, this does not limit the inventive concept within specific embodiments and it should be understood that the inventive concept covers all the modifications, equivalents, and replacements within the scope of the inventive concept.

In the description of the inventive concept, certain detailed explanations of the related art are omitted when it is deemed that they may unnecessarily obscure the essence of the inventive concept. In addition, numeral figures (for example, 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit", "er", "or", "module", and the like disclosed in the specification mean a unit that processes at least one function or operation and this may be implemented by hardware or software or a combination of hardware and software.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

Reference will now be made in detail to embodiments, examples of which are illustrated in the accompanying drawings.

Figure 1:
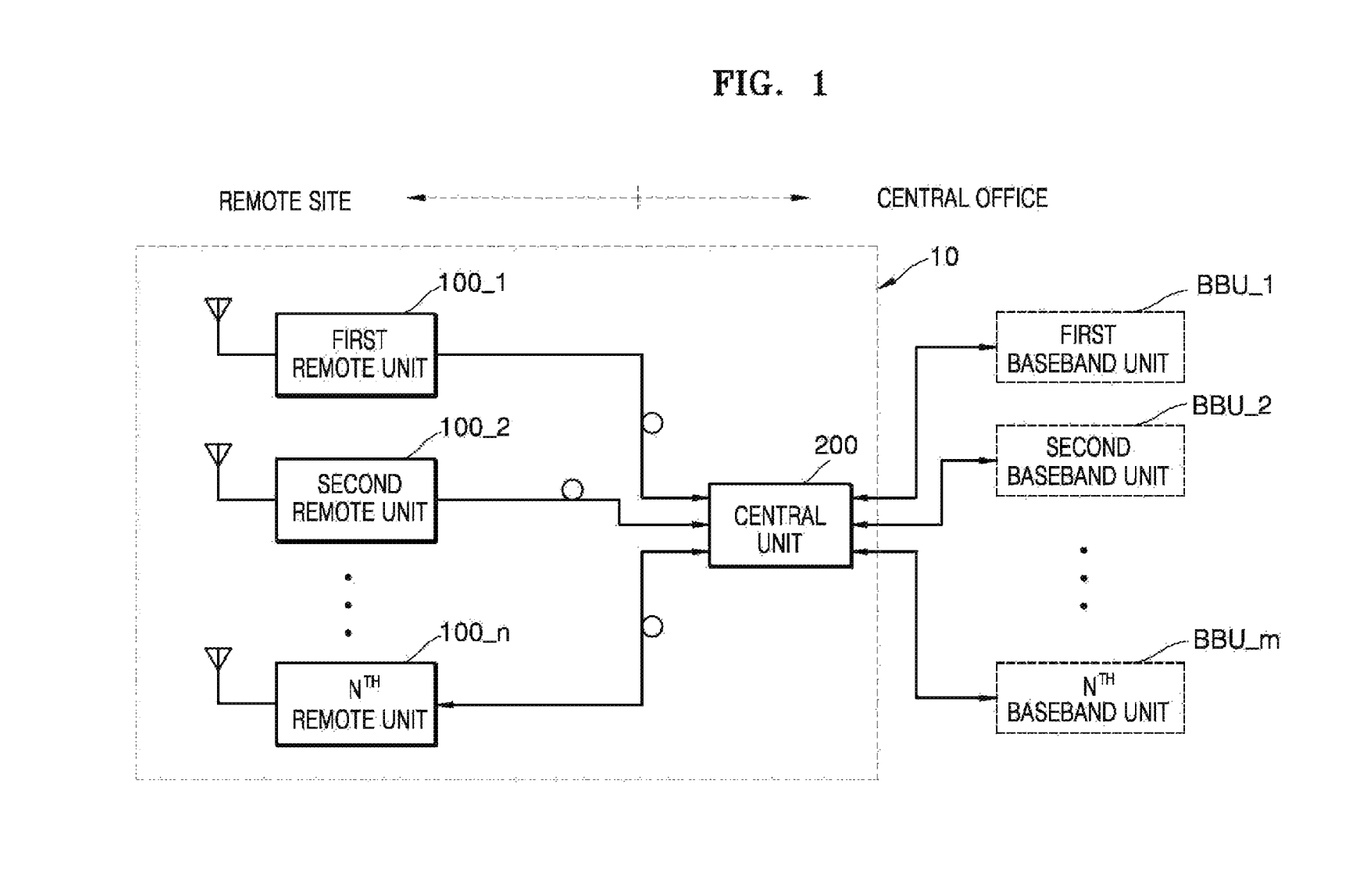
FIG. 1 is an exemplary view of a topology of a satellite signal relay system, according to an embodiment of the inventive concept.

FIG. 1 is an exemplary view of a topology of a satellite signal relay system, according to an embodiment of the inventive concept.

Referring to FIG. 1, a satellite signal relay system 10 may include first to $n^{th}$ (n is a natural number of 2 or more) remote units 100_1 to 100_n and a central unit 200.

Each of the first to $n^{th}$ remote units 100_1 to 100_n may be arranged in a remote site spaced apart from a central office by a predetermined distance. According to an embodiment, at least one of the first to $n^{th}$ remote units 100_1 to 100_n may be installed in a remote radio unit constituting a mobile communication base station and covering a specific cell area and may be arranged in the specific cell area.

Each of the first to $n^{th}$ remote units 100_1 to 100_n may receive an analog satellite signal. The analog satellite signal may be, e.g., a signal received from a global positioning system (GPS) satellite. Each of the first to $n^{th}$ remote units 100_1 to 100_n may convert the received analog satellite signal into a digital satellite signal. Each of the first to $n^{th}$ remote units 100_1 to 100_n may transmit the digital satellite signal to the central unit 200. When transmitting the digital satellite signal, each of the first to $n^{th}$ remote units 100_1 to 100_n may transmit a characteristic signal with respect to a characteristic of a satellite signal and a delay measurement signal, which is received from the central unit 200, for measuring a delay according to a distance from the central unit 200, to the central unit 200 together with the digital satellite signal. Detailed configuration and functions of the first to $n^{th}$ remote units 100_1 to 100_n will be described in more detail later below with reference to FIG. 2.

The central unit 200 may be arranged adjacent to first to mth baseband units BBU_1 to BBU_m in the central office. However, the inventive concept is not limited thereto, and the central unit 200 may be arranged at a position spaced apart from the first to mth baseband units BBU_1 to BBU_m by a predetermined interval.

The central unit 200 may select any one of the digital satellite signals received from the first to $n^{th}$ remote units 100_1 to 100_n, and may convert the selected satellite signal into an analog satellite signal again. The central unit 200 may compensate for a delay according to a corresponding transmission distance of each of the digital satellite signals based on the delay measurement signals received from the first to $n^{th}$ remote units 100_1 to 100_n. Alternatively, the central unit 200 may compensate for a delay of each of the digital satellite signals based on an input delay value of a system administrator. The central unit 200 may select any one of the delay-compensated digital satellite signals based on the characteristic signals received from the first to $n^{th}$ remote units 100_1 to 100_n, and may convert the selected digital satellite signal into an analog satellite signal again.

The central unit 200 may distribute the converted analog satellite signal to the first to mth baseband units BBU_1 to BBU_m, and thus each of the first to mth baseband units BBU_1 to BBU_m may use the distributed analog satellite signal for synchronization. Detailed configuration and functions of the central unit 200 will be described in more detail later below with reference to FIG. 3.

As such, the satellite signal relay system 10 transmits any one of satellite signals received from the remote site to the first to mth baseband units BBU_1 to BBU_m of the central office. As a result, each of the first to mth baseband units BBU_1 to BBU_m does not need to further include an antenna for receiving satellite signals, a configuration for signal processing, and the like, and may stably receive satellite signals of high quality. Therefore, a mobile communication service provider may construct a base station at low cost, improve spatial and installation efficiency, and provide a stable mobile communication service.

Furthermore, the satellite signal relay system 10 digitally transmits satellite signals between the first to $n^{th}$ remote units 100_1 to 100_n and the central unit 200, thereby achieving high transmission capacity and transmission speed and preventing deterioration of characteristics of the satellite signals due to long-distance transmission.

Meanwhile, FIG. 1 shows that the first to $n^{th}$ remote units 100_1 to 100_n and the central unit 200 are connected to each other through an optical cable. However, the inventive concept is not limited thereto and a signal transport medium therebetween may vary. For example, the optical cable may be replaced by a radio frequency (RF) cable, an unshielded twisted pair (UTP) cable, or the like. Furthermore, FIG. 1 shows that the central unit 200 and the first to $m^{th}$ base band units BBU_1 to BBU_m are connected to each other through an RF cable. However, the inventive concept is not limited thereto and a signal transport medium therebetween may vary. For example, the RF cable may be replaced with an optical cable, a UTP cable, or the like. However, the following description will be made with reference to FIG. 1.

Figure 2:
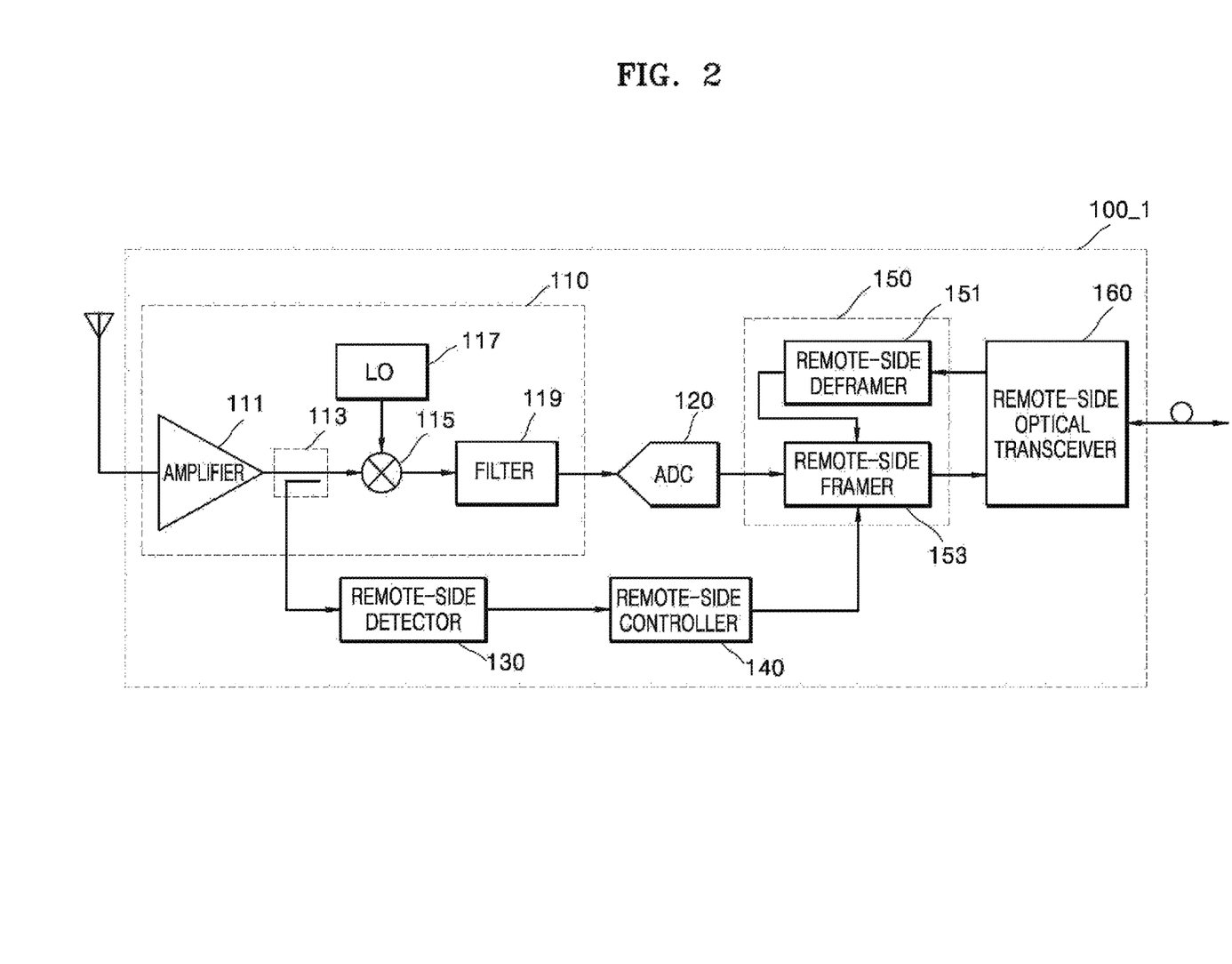
FIG. 2 is a view of a partial configuration of a remote unit according to an embodiment of the inventive concept.

FIG. 2 is a view of a partial configuration of a remote unit according to an embodiment of the inventive concept. Although FIG. 2 is an exemplary view of the first remote unit 100_1 in FIG. 1, the second to $n^{th}$ remote units 100_2 to 100_n in FIG. 1 may also correspond to the first remote unit 100_1 of FIG. 2. FIG. 2 is described with reference to FIG. 1 and repeated descriptions thereof will not be given herein for convenience of description.

Referring to FIG. 2, the first remote unit 100_1 may include a remote-side RF processor 110, an analog-to-digital converter (ADC) 120, a remote-side detector 130, a remote-side controller 140, a remote-side digital processor 150, and a remote-side optical transceiver 160.

The remote-side RF processor 110 may perform predetermined analog signal processing on an analog satellite signal input through a satellite signal antenna and output the analog satellite signal. The remote-side RF processor 110 may include an amplifier 111, a distributor 113, a mixer 115, a local oscillator (LO) 117, and a filter 119. Meanwhile, according to an embodiment, the mixer 115 and the LO 117 may be omitted.

The amplifier 111 is capable of performing low-noise amplification on the input analog satellite signal. The amplifier 111 may include, e.g., a low-noise amplifier. The distributor 113 may distribute the low-noise amplified analog satellite signal to the mixer 115 and the remote-side detector 130. The distributor 113 may include, e.g., a coupler. The mixer 115 may frequency down-convert the low-noise amplified analog satellite signal. The mixer 115 may convert a frequency of the analog satellite signal to an intermediate frequency using a local oscillation frequency provided by the LO 117. The filter 119 may filter the frequency down-converted analog satellite signal to remove noise and the like, and then may output the signal to the ADC 120. The filter 119 may include, e.g., a low pass filter.

The ADC 120 may generate a digital satellite signal by digitizing the analog satellite signal output from the remote-side RF processor 110 after the performing of predetermined analog signal processing. The ADC 120 may output the generated digital satellite signal to the remote-side digital processor 150. Meanwhile, FIG. 2 shows that the ADC 120 is implemented as a separate module from the remote-side digital processor 150, but the inventive concept is not limited thereto. The ADC 120 may also be implemented as a module integrated with the remote-side digital processor 150.

The distributor 113 of the remote-side RF processor 110 may distribute the analog satellite signal to the remote-side detector 130. The remote-side detector 130 may detect characteristic information on the distributed analog satellite signal. The characteristic information may indicate, e.g., a carrier-to-noise ratio (CN) of the analog satellite signal. However, the inventive concept is not limited thereto, and the characteristic information may indicate at least one of various characteristics related to quality of the analog satellite signal.

The remote-side controller 140 may generate a characteristic signal based on the characteristic information received from the remote-side detector 130 and may transmit the generated characteristic signal to the remote-side digital processor 150. Meanwhile, although not shown in FIG. 2, the remote-side controller 140 may control at least one of the remote-side RF processor 110, the ADC 120, the remote-side digital processor 150, and the remote-side optical transceiver 160.

The remote-side digital processor 150 may generate a transmission frame based on the digital satellite signal output from the ADC 120 and the characteristic signal received from the remote-side controller 140. Furthermore, the remote-side digital processor 150 may further receive an optical transmission frame received from the central unit 200 through the remote-side optical transceiver 160, and may generate the transmission frame based on a delay measurement signal included in the optical transmission frame, the digital satellite signal, and the characteristic signal.

The remote-side digital processor 150 may include a remote-side deframer 151 and a remote-side framer 153. The remote-side digital processor 150 may be implemented as, e.g., a field programmable gate array (FPGA) module.

The remote-side deframer 151 may extract a delay measurement signal from the optical transmission frame received from the central unit 200 and may transmit the extracted delay measurement signal to the remote-side framer 153. The remote-side framer 153 may generate the transmission frame based on the digital satellite signal output from the ADC 120, the characteristic signal received from the remote-side controller 140, and the delay measurement signal received from the remote-side deframer 151. The remote-side framer 153 may transmit the generated transmission frame to the remote-side optical transceiver 160.

The remote-side optical transceiver 160 may electro-optically convert the transmission frame received from the remote-side framer 153 of the remote-side digital processor 150 into an optical transmission frame and may output the optical transmission frame to the central unit 200 through a corresponding optical transmission medium. The remote-side optical transceiver 160 may receive the optical transmission frame transmitted by the central unit 200 through the optical transmission medium to electro-optically convert the optical transmission frame into a transmission frame of the central unit 200, and may transmit the transmission frame of the central unit 200 to the remote-side deframer 151 of the remote-side digital processor 150.

Figure 3:
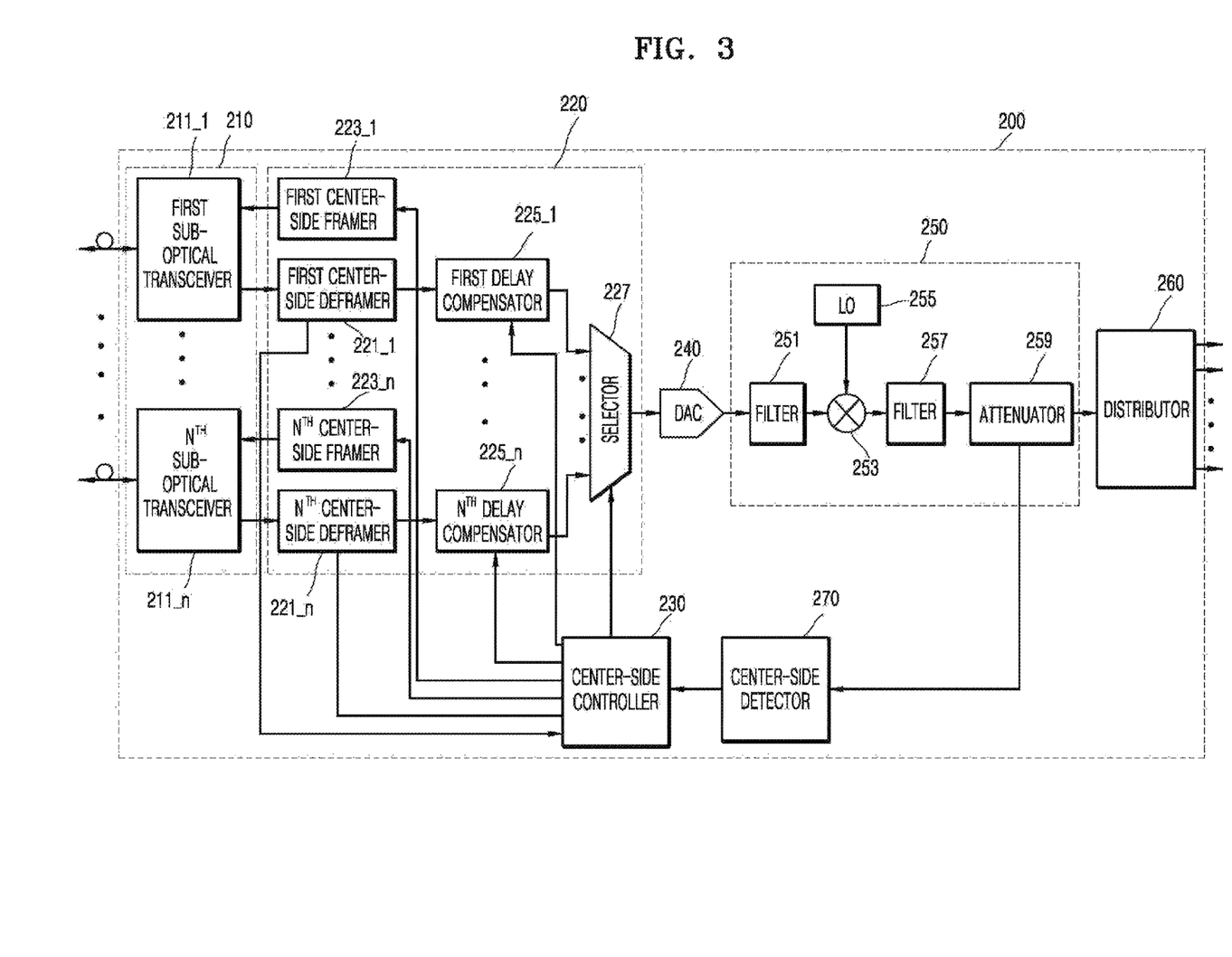
FIG. 3 is a view of a partial configuration of a central unit according to an embodiment of the inventive concept.

FIG. 3 is a view of a partial configuration of a central unit according to an embodiment of the inventive concept. FIG. 3 is an exemplary view of the central unit 200 in FIG. 2. FIG. 3 is described with reference to FIG. 1 and repeated descriptions thereof will not be given herein for convenience of description.

Referring to FIG. 3, the central unit 200 may include a center-side optical transceiver 210, a center-side digital processor 220, a center-side controller 230, a digital-to-analog converter (DAC) 240, a center-side RF processor 250, a distributor 260, and a center-side detector 270.

The center-side optical transceiver 210 may convert an optical transmission frame received from each of the first to $n^{th}$ remote units 100_1 to 100_$n$ through a corresponding optical transmission medium into a transmission frame. The center-side optical transceiver 210 may convert transmission frames, which are received from the center-side digital processor 220 and include a delay measurement signal for measuring a delay according to a transmission distance between the first to $n^{th}$ remote units 100_1 to 100_$n$ and the central unit 200, into optical transmission frames and transmit them to the first to $n^{th}$ remote units 100_1 to 100_$n$, respectively.

The center-side optical transceiver 210 may include first to $n^{th}$ sub-optical transceivers 211_1 to 211_$n$ each coupled with a remote-side optical transceiver of a corresponding one of the first to $n^{th}$ remote units 100_1 to 100_$n$. Meanwhile, FIG. 2 shows that the center-side optical transceiver 210 includes a number of sub-optical transceivers corresponding to the number of remote units, but the inventive concept is not limited thereto. According to an embodiment, the center-side optical transceiver 210 may include fewer sub-optical transceivers than the number of remote units, wherein some of the sub-optical transceivers may be coupled with remote-side optical transceivers of at least two remote units.

Each of the first to $n^{th}$ sub-optical transceivers 211_1 to 211_$n$ may electro-optically convert an optical transmission frame, which is received from a remote-side optical transceiver of a corresponding one of the first to $n^{th}$ remote units 100_1 to 100_$n$, into a transmission frame and output the transmission frame. The first to $n^{th}$ sub-optical transceivers 211_1 to 211_$n$ may electro-optically convert transmission frames received from the center-side digital processor 220 into optical transmission frames and output the optical transmission frames to the first to $n^{th}$ remote units 100_1 to 100_$n$, respectively.

The center-side digital processor 220 may extract a digital satellite signal, a characteristic signal, and a delay measurement signal from each of the transmission frames output from the center-side optical transceiver 210, and selectively output any one of the extracted digital satellite signals. The center-side digital processor 220 may generate transmission frames based on a delay measurement signal received from the center-side controller 230 and transmit the generated transmission frames to the center-side optical transceiver 210.

The center-side digital processor 220 may include first to $n^{th}$ center-side deframers 221_1 to 221_$n$, first to $n^{th}$ center-side framers 223_1 to 223_$n$, first to $n^{th}$ delay compensators 225_1 to 225_$n$, and a selector 227. The center-side digital processor 220 may be implemented as, e.g., an FPGA module.

Each of the first to $n^{th}$ center-side deframers 221_1 to 221_$n$ may extract a digital satellite signal, a characteristic signal, and a digital satellite signal from a transmission frame output from a corresponding one of the first to $n^{th}$ sub-optical transceivers 211_1 to 211_$n$. Each of the first to $n^{th}$ center-side deframers 221_1 to 221_$n$ may transmit the extracted digital satellite signal to a corresponding one of the first to $n^{th}$ delay compensators 225_1 to 225_$n$, and may transmit the extracted characteristic signal and extracted digital satellite signal to the center-side controller 230.

Each of the first to $n^{th}$ center-side framers 223_1 to 223_$n$ may generate a transmission frame based on the delay measurement signal received from the center-side controller 230 and output the generated transmission frame to a corresponding one of the first to $n^{th}$ sub-optical transceivers 211_1 to 211_$n$.

Each of the first to $n^{th}$ delay compensators 225_1 to 225_$n$ may compensate for a delay of a digital satellite signal received from a corresponding one of the first to $n^{th}$ center-side deframers 221_1 to 221_$n$. The delay compensation of the first to $n^{th}$ delay compensators 225_1 to 225_$n$ may be controlled by the center-side controller 230.

The selector 227 may output any one of the delay-compensated digital satellite signals output from the first to $n^{th}$ delay compensators 225_1 to 225_$n$ to the DAC 240. The selective output for the digital satellite signals of the selector 227 may be controlled by the center-side controller 230. The selector 227 may include, e.g., a multiplexer, a switch, and the like.

The center-side controller 230 may measure delay values between the central unit 200 and the first to $n^{th}$ remote units 100_1 to 100_$n$ based on the delay measurement signals received from the center-side digital processor 220. The center-side controller 230 may control the delay compensation of each of the first to $n^{th}$ delay compensators 225_1 to 225_$n$ for the digital satellite signals, based on the measured delay values. According to an embodiment, the center-side controller 230 may control the delay compensation of each of the first to $n^{th}$ delay compensators 225_1 to 225_$n$ for the digital satellite signals, based on a predetermined delay value, for example, a delay value set by a system administrator in advance according to a delay amount, the type of a mobile communication service, and the like required for each of the baseband units BBU_1 to BBU_m. According to another embodiment, the center-side controller 230 may control the delay compensation of each of the first to $n^{th}$ delay compensators 225_1 to 225_$n$ for the digital satellite signals, based on the measured delay values and the predetermined delay values.

The center-side controller 230 may control the selector 227 to output one of the delay-compensated digital satellite signals to the DAC 240 based on the characteristic signals received from the center-side digital processor 220. For example, when a characteristic signal indicates a CN of a satellite signal, the center-side controller 230 may compare the characteristic signals with each other and control the selector 227 such that a satellite signal having the smallest noise characteristic from among the satellite signals received from the first to $n^{th}$ remote units 100_1 to 100_$n$ is output to the DAC 240.

The center-side controller 230 may detect an output state of an analog satellite signal based on output characteristic information of an analog satellite signal received from the center-side detector 270. Although not shown in FIG. 3, the center-side controller 230 may control an output level and the like of the analog satellite signal by controlling the center-side digital processor 220, the center-side RF processor 250, or the like.

The center-side controller 230 may transmit a delay measurement signal for measuring a delay between the central unit 200 and the first to $n^{th}$ remote units 100_1 to 100_$n$ to the first to $n^{th}$ center-side framers 223_1 to 223_$n$ of the center-side digital processor 220.

Meanwhile, although not shown in FIG. 3, the center-side controller 230 may control at least one of the center-side optical transceiver 210, the center-side digital processor 220, the DAC 240, and the center-side RF processor 250.

The DAC 240 may generate an analog satellite signal by converting the digital satellite signal output from the center-side digital processor 220 into an analog signal. The DAC 240 may output the generated analog satellite signal to the center-side RF processor 250. Meanwhile, FIG. 3 shows that the DAC 240 is implemented as a separate module from the center-side digital processor 220, but the inventive concept is not limited thereto. The DAC 240 may also be implemented as a module integrated with the center-side digital processor 220.

The center-side RF processor 250 may perform predetermined analog signal processing on the analog satellite signal output from the DAC 240. The center-side RF processor 250 may include a filter 251, a mixer 253, an LO 255, a filter 257, and an attenuator 259.

The filter 119 may filter the analog satellite signal output from the DAC 240 to remove noise and the like, and then may output the signal to the mixer 253. The filter 251 may be a band pass filter. The mixer 253 may frequency up-convert the filtered analog satellite signal. The mixer 253 may frequency up-convert the filtered analog satellite signal using a local oscillation frequency provided by the LO 255. Here, the filtered analog satellite signal is frequency up-converted again because the filtered analog satellite signal is converted into an intermediate frequency in a remote-side RF processor of a corresponding remote unit, and the mixer 253 and the LO 255 may be omitted if a configuration (for example, the mixer 115 and the LO 117 of FIG. 2) for frequency down-conversion is omitted in the remote-side RF processor. The filter 257 may filter the frequency up-converted analog satellite signal to remove noise and the like, and then may output the signal to the attenuator 259. The filter 257 may be a band pass filter. The attenuator 259 may adjust and output a gain of the filtered analog satellite signal.

The distributor 260 may distribute the analog satellite signal processed by the center-side RF processor 250 to the first to $m^{th}$ baseband units BBU_1 to BBU_m connected to the central unit 200.

The center-side detector 270 may receive the analog satellite signal output from the center-side RF processor 250 to detect output characteristic information, and may transmit the detected output characteristic information to the center-side controller 230.

Figure 4:
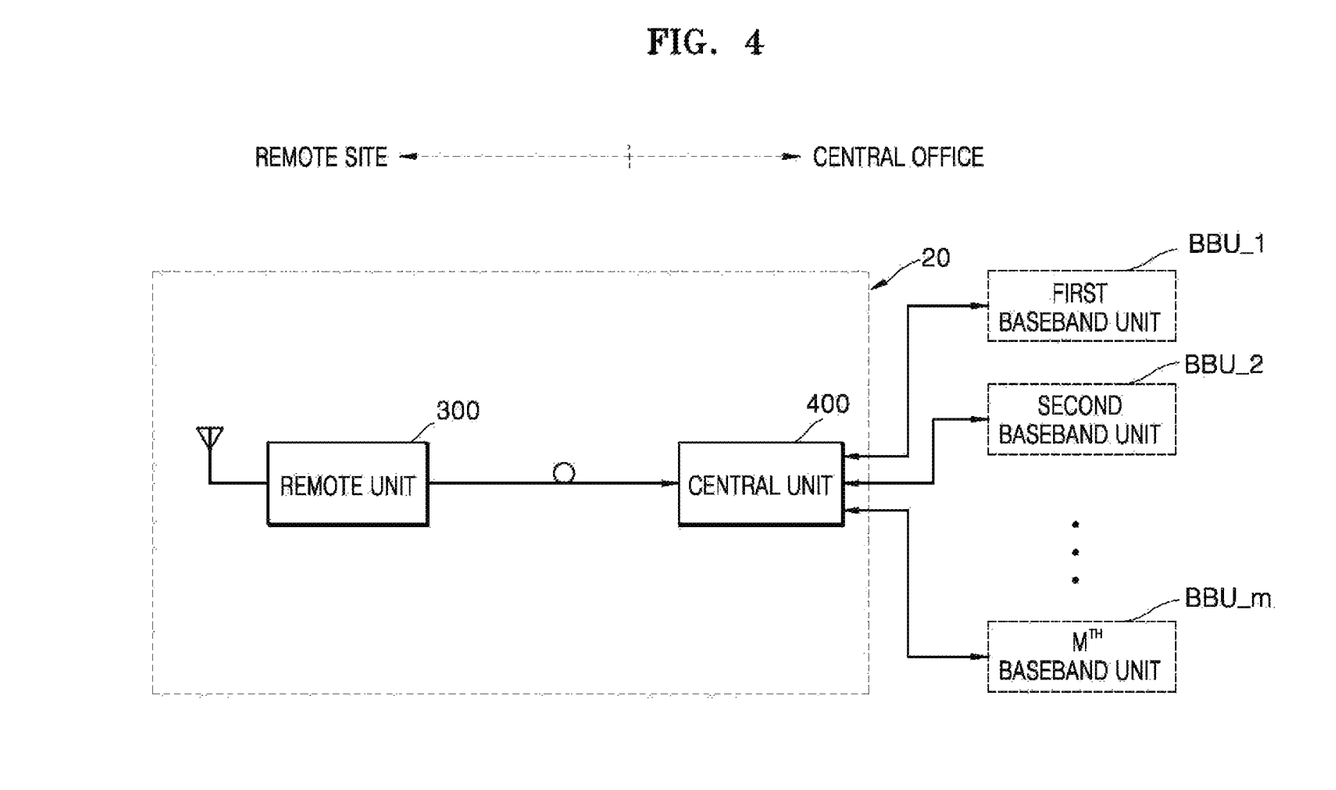
FIG. 4 is an exemplary view of a topology of a satellite signal relay system, according to another embodiment of the inventive concept.

FIG. 4 is an exemplary view of a topology of a satellite signal relay system, according to another embodiment of the inventive concept. In FIG. 4, a remote unit 300 corresponds to the first remote unit 100_1 of FIGS. 1 and 2, and a central unit 400 corresponds to the central unit 200 of FIGS. 1 and 3. FIG. 4 is described with reference to FIGS. 1 to 3 and repeated descriptions thereof will not be given herein for convenience of description.

Referring to FIG. 4, a satellite signal relay system 20 may include one remote unit 300 and a central unit 400, unlike the satellite signal relay system 10 of FIG. 1.

In the case of the satellite signal relay system 10 in FIG. 1, each of the first to $n^{th}$ remote units 100_1 to 100_$n$ in a plurality of remote sites digitally processes a received satellite signal and transmit the digital signal to the central unit 200. Thereafter, the central unit 200 selects only specific satellite signal considering quality of the transmitted satellite signals and converts the selected satellite signal into an analog signal again, and then transmits the analog signal to the first to $m^{th}$ baseband units BBU_1 to BBU_m.

Meanwhile, in the case of the satellite signal relay system 20, only the remote unit 300 at a specific remote site may digitally process a received satellite signal and transmit the digital signal to the central unit 400. Thereafter, the central unit 400 may analogize the received satellite signal and transmit the analog signal to the first to m-th baseband units BBU_1 to BBU_m.

In this case, the remote unit 300 and the central unit 400 in the satellite signal relay system 20 may have substantially the same configurations and functions as the first remote unit 100_1 of FIG. 2 and the central unit 200 of FIG. 3, respectively. However, the configurations and functions of the remote unit 300 and the central unit 400 may be changed according to an embodiment.

For example, since the central unit 400 in the satellite signal relay system 20 does not need to connect with a plurality of remote units and selectively output a plurality of satellite signals, unlike the central unit 200 of FIG. 3, some configurations (for example, a sub optical transceiver) and functions (for example, a selector control function of a center-side controller) for a selective output of satellite signals may be omitted in the central unit 400. Furthermore, unlike the first remote unit 100_1 of FIG. 2, some functions (for example, a function of generating a characteristic signal of a remote-side controller) for transmitting a characteristic signal for a received satellite signal to the central unit 400 may be omitted.

That is, configuration and functions of a remote unit and a central unit of a satellite signal relay system may be adaptively changed according to a required operating environment, thereby maximizing an effect of reducing a construction cost of a mobile communication base station.

While the embodiments have been particularly shown and described, it will be understood by those of ordinary skill in the art that various changes in form and details may be made therein without departing from the scope of the inventive concept as defined by the appended claims.

What is claimed is:

1. A satellite signal relay system comprising:
a plurality of remote units configured to receive an analog satellite signal, to convert the analog satellite signal into a digital satellite signal, to generate a characteristic signal for the analog satellite signal, to generate a transmission frame based on the digital satellite signal and the characteristic signal, and to convert the transmission frame into an optical transmission frame; and
a central unit configured to convert optical transmission frames received from the plurality of remote units into transmission frames through an optical transmission medium, respectively, to extract a digital satellite signal and a characteristic signal from each of the converted transmission frames, and to convert any one of the extracted digital satellite signals into an analog satellite signal based on the extracted characteristics signals.

2. The satellite signal relay system of claim 1, wherein each of the plurality of remote units is configured to detect characteristic information of the analog satellite signal, and to generate the characteristic signal based on the detected characteristic information.

3. The satellite signal relay system of claim 2, wherein the characteristic information is configured to indicate a carrier-to-noise ratio (CN) of the analog satellite signal.

4. The satellite signal relay system of claim 1, wherein each of the plurality of remote units is configured to receive a delay measurement signal received from the central unit through the optical transmission medium, and to generate the transmission frame based on the delay measurement signal, the digital satellite signal, and the characteristic signal such that the delay measurement signal is retransmitted to the central unit.

5. The satellite signal relay system of claim 1, wherein each of the plurality of remote units comprises:
a remote-side RF processor configured to perform low-noise amplification on the analog satellite signal, to frequency down-convert the low-noise amplified analog satellite signal, and to filter and output the frequency down-converted analog satellite signal;
an analog-to-digital converter configured to convert the filtered analog satellite signal into the digital satellite signal;
a remote-side detector configured to detect characteristic information on the analog satellite signal distributed from the remote-side RF processor;
a remote-side controller configured to generate the characteristic signal based on the detected characteristic information;
a remote-side digital processor configured to generate the transmission frame based on the digital satellite signal received from the analog-to-digital converter and the characteristic signal received from the remote-side controller; and
a remote-side optical transceiver configured to convert the transmission frame into the optical transmission frame and to transmit the optical transmission frame to the central unit through the optical transmission medium.

6. The satellite signal relay system of claim 5, wherein the remote-side digital processor comprises:
a remote-side framer configured to generate the transmission frame based on the digital satellite signal and the characteristic signal.

7. The satellite signal relay system of claim 6, wherein the remote-side digital processor further comprises:
a remote-side deframer configured to extract a delay measurement signal from an optical transmission frame that is received from the central unit through the optical transmission medium, wherein
the remote-side framer is configured to generate the transmission frame based on the delay measurement signal, the digital satellite signal, and the characteristic signal received from the remote-side deframer.

8. The satellite signal relay system of claim 1, wherein the converted transmission frames further comprise:
a delay measurement signal that each of the plurality of remote units retransmits to the central unit, wherein
the central unit is configured to measure a delay value for each of the plurality of remote units based on a delay measurement signal included in each of the converted transmission frames, to compensate for a delay of the extracted digital satellite signals based on at least one of the measured delay values and a predetermined delay value, and to convert any one of the delay-compensated digital satellite signals into the analog satellite signal based on the extracted characteristic signals.

9. The satellite signal relay system of claim 1, wherein the central unit comprises:
a center-side optical transceiver configured to convert the optical transmission frames received from the plurality of remote units into the transmission frames through the optical transmission medium, respectively;
a center-side digital processor configured to extract the digital satellite signal and the characteristic signal from each of the transmission frames received from the center-side optical transceiver, and to selectively output any one of the extracted digital satellite signals;
a digital-to-analog converter configured to convert the digital satellite signal output from the center-side digital processor into the analog satellite signal; and
a center-side RF processor configured to frequency up-convert the analog satellite signal.

10. The satellite signal relay system of claim 9, wherein the center-side digital processor comprises:
a plurality of center-side deframers configured to extract a digital satellite signal and a characteristic signal from a corresponding one of the transmission frames received from the center-side optical transceiver; and
a selector configured to selectively output any one of the extracted digital satellite signals.

11. The satellite signal relay system of claim 10, wherein the central unit further comprises:
a center-side controller configured to control the selector such that any one of the extracted digital satellite signals is selectively output based on the characteristic signals received from the plurality of center-side deframers.

12. The satellite signal relay system of claim 9, wherein the converted transmission frames further comprise:
a delay measurement signal that each of the plurality of remote units retransmits to the central unit, wherein
the center-side digital processor is configured to extract the digital satellite signal, the characteristics signal, and the delay measurement signal from each of the transmission frames received from the center-side optical transceiver, to compensate for a delay of the extracted digital satellite signals, and to selectively output any one of the delay-compensated digital satellite signals.

13. The satellite signal relay system of claim 12, wherein the center-side digital processor comprises:
a plurality of center-side deframers configured to extract a digital satellite signal, a characteristic signal, and a delay measurement signal from a corresponding one of the transmission frames received from the center-side optical transceiver;
a plurality of delay compensators configured to compensate for a delay of a digital satellite signal received from a corresponding one of the plurality of center-side deframers; and
a selector configured to selectively output any one of the delay-compensated digital satellite signals received from the plurality of delay compensators.

14. The satellite signal relay system of claim 13, wherein the central unit further comprises:
a center-side controller configured to measure a delay value for each of the plurality of remote units based on a delay measurement signal transmitted to the plurality of center-side deframers, to control the plurality of delay compensators such that the delay of the digital satellite signals is compensated based on at least one of the measured delay values and a predetermined delay value, and to control the selector such that any one of the delay-compensated digital satellite signals is selectively output based on the characteristic signals received from the plurality of deframers.

15. A satellite signal relay system comprising:
a remote unit configured to receive an analog satellite signal, to convert the analog satellite signal into a digital satellite signal, to generate a transmission frame based on the digital satellite signal, and to convert the transmission frame into an optical transmission frame; and
a central unit configured to convert an optical transmission frame received from the remote unit through an optical transmission medium into a transmission frame, to extract a digital satellite signal from the converted transmission frame, and to convert the digital satellite signal into an analog satellite signal.

16. The satellite signal relay system of claim 15, wherein the analog satellite signal is a signal received from a global positioning system (GPS) satellite.

17. The satellite signal relay system of claim 15, wherein the remote unit is configured to receive a delay measurement signal received from the central unit through the optical transmission medium, and to generate the transmission frame based on the delay measurement signal and the digital satellite signal such that the delay measurement signal is retransmitted to the central unit, wherein
the central unit is configured to extract the digital satellite signal and the delay measurement signal from the converted transmission frame, to measure a delay value for the remote unit based on the extracted delay measurement signal, to compensate for a delay of the extracted digital satellite signal based on at least one of the measured delay value and a predetermined delay value, and to convert the delay-compensated digital satellite signal into the analog satellite signal.

18. The satellite signal relay system of claim 15, wherein the central unit is configured to transmit the analog satellite signal to at least one baseband unit constituting a base station through a predetermined transmission medium.

* * * * *